United States Patent
Iizuka et al.

(10) Patent No.: US 8,683,146 B2
(45) Date of Patent: Mar. 25, 2014

(54) STORAGE APPARATUS AND CONTROLLING METHOD OF STORAGE APPARATUS

(75) Inventors: Wataru Iizuka, Kawasaki (JP); Atsushi Ishii, Yokosuka (JP); Noboru Ishiwata, Kawaski (JP); Masanori Itoh, Yokohama (JP); Yoshihito Konta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 183 days.

(21) Appl. No.: 13/416,567

(22) Filed: Mar. 9, 2012

(65) Prior Publication Data

US 2012/0239888 A1    Sep. 20, 2012

(30) Foreign Application Priority Data

Mar. 18, 2011   (JP) ................................. 2011-061386

(51) Int. Cl.
*G06F 12/00*   (2006.01)
(52) U.S. Cl.
USPC ............................ 711/154; 711/112; 711/114
(58) Field of Classification Search
None
See application file for complete search history.

(56) References Cited

U.S. PATENT DOCUMENTS

2006/0047908 A1 *   3/2006   Chikusa et al. ............... 711/114

FOREIGN PATENT DOCUMENTS

| JP | 59-70145    | 4/1984 |
| JP | 2003-44178  | 2/2003 |
| JP | 2006-72636  | 3/2006 |
| JP | 2006-155392 | 6/2006 |

* cited by examiner

*Primary Examiner* — Shawn X Gu
(74) *Attorney, Agent, or Firm* — Staas & Halsey LLP (57) ABSTRACT

A storage apparatus including: a first controller that generates an access to a storage device; the first controller includes: a first relay unit configured to relay the access to the storage device; and an access control unit configured to be activated after activation of the first relay unit and to relay the access to the storage device via a second relay unit; and a second controller that includes the second relay unit and generates the access to the storage device, wherein when the first relay unit receives a connection request for an access path between the first relay unit and the storage device from the second controller, the first relay unit establishes the access path to the storage device irrespective of an activation state of the access control unit.

5 Claims, 7 Drawing Sheets

STORAGE APPARATUS AND CONTROLLING METHOD OF STORAGE APPARATUS

CROSS-REFERENCE TO RELATED APPLICATION

This application is based upon and claims the benefit of priority of the prior Japanese Patent Application No. 2011-61386, filed on Mar. 18, 2011, the entire contents of which are incorporated herein by reference.

FIELD

The embodiments discussed herein are related to a storage apparatus and a controlling method of a storage apparatus.

BACKGROUND

In recent years, there is widespread use of storage apparatuses including a plurality of mass storage devices such as Hard Disk Drives (HDDs). A storage system typically includes a plurality of storage devices, and a controller that controls access to these storage devices. There are also storage systems in which a plurality of controllers are provided to allow redundancy in the access paths to the storage devices. By providing redundancy in the access paths, the reliability of access to the storage devices may be improved.

Further, redundancy may be provided in the access path between each controller and the storage device by providing each controller with a second access path that goes through another controller between the controller and the storage device, in addition to a first access path that directly connects the controller and the storage device. For example, a conceivable configuration is such that in a case where each controller includes an expander that relays access to the storage device, each controller makes access to the storage device by using an access path through which the controller accesses the storage device via the expander within the controller itself, and an access path through which the controller accesses the storage device via an expander included in another controller.

In a case where each controller is configured such that its expander is activated with activation of a control unit that controls storage of data in the storage device, if the control unit in one controller is not activated due to some reason, it is no longer possible to access the storage device by using an access path that uses an expander connected to the control unit that is not activated.

Examples of related art are discussed in Japanese Laid-open Patent Publications Nos. 2006-155392, 2006-72636, 59-070145, and 2003-44178.

SUMMARY

According to an aspect of the invention, a storage apparatus including: a first controller that generates an access to a storage device; the first controller includes: a first relay unit configured to relay the access to the storage device; and an access control unit configured to be activated after activation of the first relay unit and to relay the access to the storage device via a second relay unit; and a second controller that includes the second relay unit and generates the access to the storage device, wherein when the first relay unit receives a connection request for an access path between the first relay unit and the storage device from the second controller, the first relay unit establishes the access path to the storage device irrespective of an activation state of the access control unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, a storage apparatus according to the embodiments is described in detail with reference to the drawings. An embodiment of a storage apparatus is described with reference to a first embodiment, and then the storage apparatus is described more specifically with reference to a second embodiment.

<First Embodiment>

Figure 1:
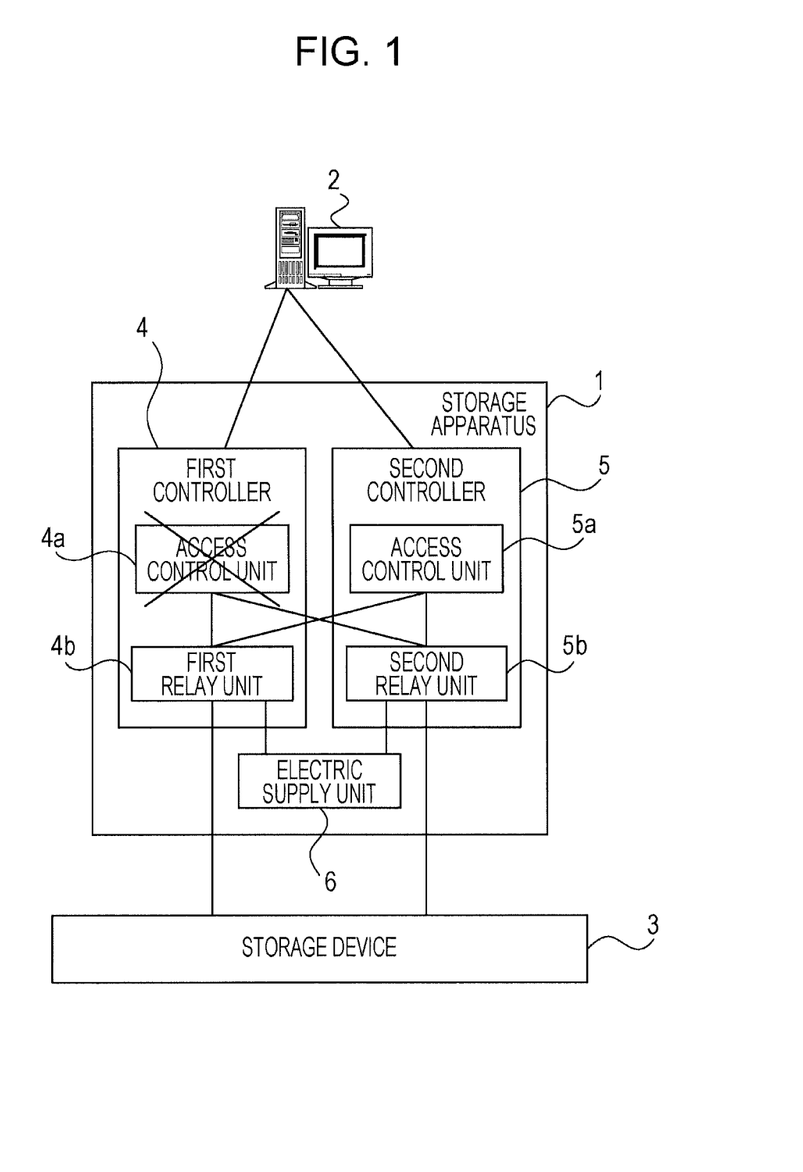
FIG. 1 illustrates a storage apparatus according to a first embodiment.

FIG. 1 illustrates a storage apparatus according to a first embodiment.

A storage apparatus 1 according to the first embodiment has a first controller 4 and a second controller 5 that each accesses a storage device 3 upon instruction from a host apparatus 2. While the storage apparatus 1 in FIG. 1 has two controllers, the first controller 4 and the second controller 5, the storage apparatus 1 may have three or more controllers.

The storage device 3 is a device that stores data. For example, the storage device 3 has a plurality of internal storage media such as HDDs. The first controller 4 and the second controller 5 each control access to the storage device 3. The first controller 4 and the second controller 5 each make access to the storage device 3 in response to an access request for the storage device 3 from the host apparatus 2.

For example, upon accepting a request for reading data stored in the storage device 3 from the host apparatus 2, the first controller 4 and the second controller 5 each read the requested data from the storage device 2, and transmit the read data to the host apparatus 2. Also, upon accepting a request for writing data to the storage device 3 from the host apparatus 2, the first controller 4 and the second controller 5 each write the requested data to the storage device 3. The first controller 4 and the second controller 5 may include the function of caching data stored in the storage device 3.

The first controller 4 and the second controller 5 have the same configuration. The first controller 4 includes an access control unit 4a and a first relay unit 4b. The second controller 5 includes an access control unit 5a and a second relay unit 5b. The access control unit 4a and the access control unit 5a, and the first relay unit 4b and the second relay unit 5b may each execute the same processing.

The access control unit 4a accesses the storage device 3 via the first relay unit 4b or the second relay unit 5b. The access control unit 5a accesses the storage device 3 via the second relay unit 5b or the first relay unit 4b.

The first relay unit 4b relays access from the access control unit 4a to the storage device 3, and also relays access from the access control unit 5a to the storage device 3. The second relay unit 5b relays access from the access control unit 5a to the storage device 3, and also relays access from the access control unit 4a to the storage device 3.

In this way, by providing redundancy in each of the access path from the access control unit 4a to the storage device 3, and the access path from the access control unit 5a to the storage device 3, the reliability of access from the host apparatus 2 to the storage device 3 improves.

An electrical supply unit 6 supplies power from a control power source to each of the first controller 4 and the second controller 5. The electrical supply unit 6 may be configured with redundancy. For example, when activating the first controller 4, power from a control power source is supplied to the first relay unit 4b from the electrical supply unit 6. With the supply of power, the first relay unit 4b is activated prior to activation of the access control unit 4a. The first relay unit 4b permits supply of power from the electrical supply unit 6 to the access control unit 4a. This permission enables activation of the access control unit 4a. When the access control unit 4a is activated, the access control unit 4a establishes connection with the first relay unit 4b.

The first relay unit 4b may start monitoring for a fault in the first controller 4 after being activated. Examples of the kinds of fault include, for example, a temperature fault (e.g. overheating), a current fault (e.g. over-current), and a voltage fault (e.g. over-voltage). If no fault is present as a result of monitoring, the first relay unit 4b may permit supply of power from the electrical supply unit 6 to the access control unit 4a. If a fault is present as a result of monitoring, the first relay unit 4b does not permit supply of power from the electrical supply unit 6 to the access control unit 4a. Consequently, the access control unit 4a is not activated. The first control unit 4b may determine whether or not to permit supply of power from the electrical supply unit 6 to the access control unit 4a depending on the kind of the fault. Also, the first control unit 4b may stop activation of the first relay unit 4b depending on the kind of the fault. FIG. 1 illustrates, as an example, a case where the first relay unit 4b does not permit supply of power from the electrical supply unit 6 to the access control unit 4a, and the access control unit 4a is not activated. At this time, when the first relay unit 4b receives a connection request for the access path between the first relay unit 4b and the storage device 3 from the second controller 5, the first relay unit 4b establishes the access path to the storage device 3, irrespective of the activation state of the access control unit 4a. Therefore, in a state in which the access control unit 5a is activated, and the second relay unit 5b has established an access path to the storage device 3, the access control unit 5a is able to access the storage device 3 via the second relay unit 5b or the first relay unit 4b. Therefore, the host apparatus 2 may ensure a redundant access path to the storage device 3.

After establishing the access path to the storage device 3, the first relay unit 4b may notify the second relay unit 5b of a connection request for connection to the storage device 3. With this notification, the second relay unit 5b establishes an access path to the storage device 3 irrespective of the state of the access control unit 4a. Therefore, in a state in which the access control unit 4a is activated, and the first relay unit 4b has established an access path to the storage device 3, the access control unit 4a is able to access the storage device 3 via the first relay unit 4b or the second relay unit 5b. According to the storage apparatus 1, a redundant access path from the host apparatus 2 to the storage device 3 may be secured if either one of the access control units 4a or 5a is activated.

<Second Embodiment>

Figure 2:
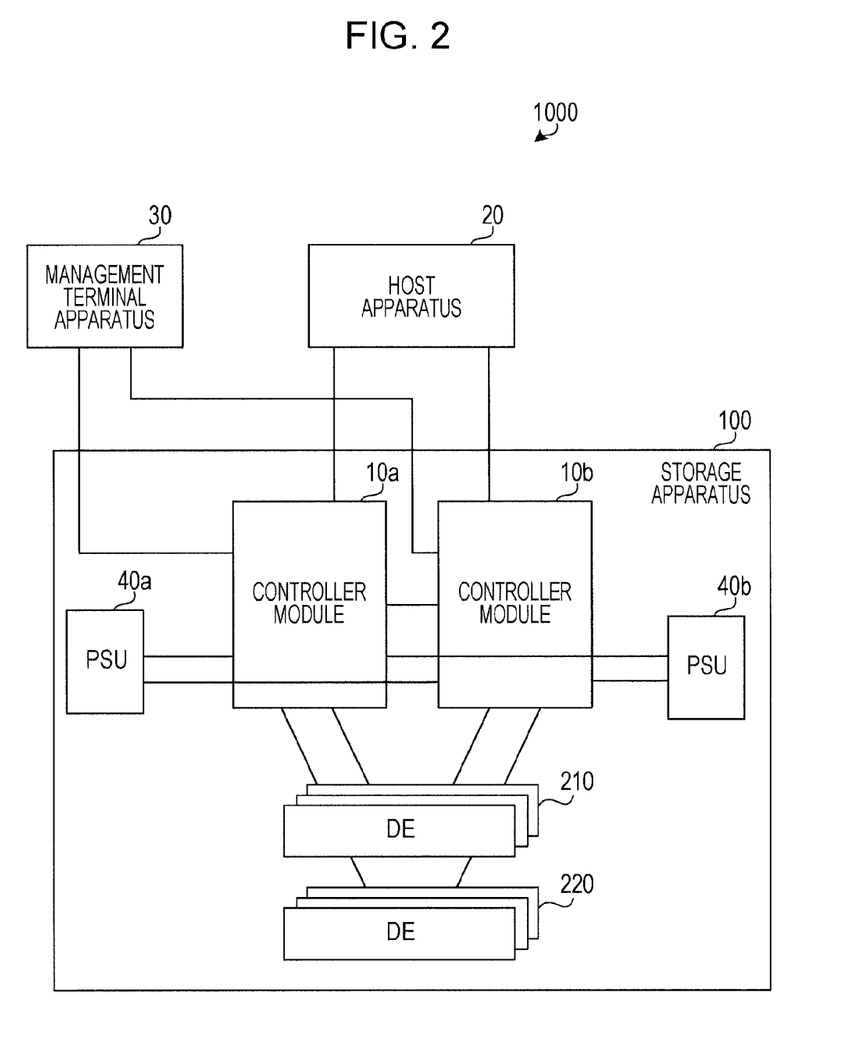
FIG. 2 illustrates a general configuration example of a storage system according to a second embodiment.

Next, a configuration example of a storage apparatus using expanders as relay units that relay access to storage devices is described. FIG. 2 illustrates a general configuration example of a storage system according to a second embodiment.

A storage system 1000 illustrated as FIG. 2 has a storage apparatus 100, a host apparatus 20, and a management terminal apparatus 30.

The storage apparatus 100 includes a plurality of HDDs. A plurality of HDDs are stored in each of Drive Enclosures (DEs) 210 and 220 in the storage apparatus 100. The DE 210, 220 may be provided outside of the storage apparatus 100, for example. Storage media included in the storage apparatus 100 are not limited to HDDs but may be, for example, other kinds of storage media such as Solid State Drives (SSDs). The storage apparatus 100 also includes two controller modules 10a and 10b that control access to a HDD in the DE 210, 220. The controller module 10a is an example of the first controller, and the controller module 10b is an example of the second controller.

The storage apparatus 100 is connected with the host apparatus 20 and the management terminal apparatus 30. The host apparatus 20 requests the controller module 10a or the controller module 10b in the storage apparatus 100 for access to a HDD in the DE 210 or a HDD in the DE 220, in accordance with manipulation by the user. The host apparatus 20 and the controller module 10a, 10b are connected via, for example, an optical fiber.

The management terminal apparatus 30 manages operation of the storage apparatus 100 in accordance with manipulation by the administrator. For example, in accordance with manipulation by the administrator, the management terminal apparatus 30 may request for turning-on or turning-off of the power to each of the controller modules 10a and 10b in the storage apparatus 100. The management terminal apparatus 30 and the controller module 10a, 10b are connected via, for example, a Local Area Network (LAN) cable.

The controller modules 10a and 10b each control access to a HDD in the DE 210, 220 upon access request from the host apparatus 20. For example, upon accepting a request for reading data stored in a HDD, the controller module 10a, 10b reads the requested data from the HDD, and transmits the read data to the host apparatus 20. Also, upon accepting a request for writing data to a HDD, the controller module 10a, 10b writes the requested data to the HDD.

The controller module 10a, 10b has the function of caching data stored in the HDDs in the DE 210, 220. The controller module 10a and the controller module 10b may transmit and receive data to and from each other. For example, the controller module 10a, 10b retains a backup of cached data retained by the other controller module 10a, 10b. The controller module 10a, 10b may also control the power-on state of the other controller module 10a, 10b. The controller module 10a, 10b may manage data stored in the HDDs in the DE 210, 220 by Redundant Arrays of Inexpensive Disks (RAID).

Power Supply Units (PSUs) 40a and 40b are provided in the storage apparatus 100. The PSU 40a, 40b is a power circuit that supplies power to the controller module 10a, 10b, and supplies drive power to the DE 210, 220.

Figure 3:
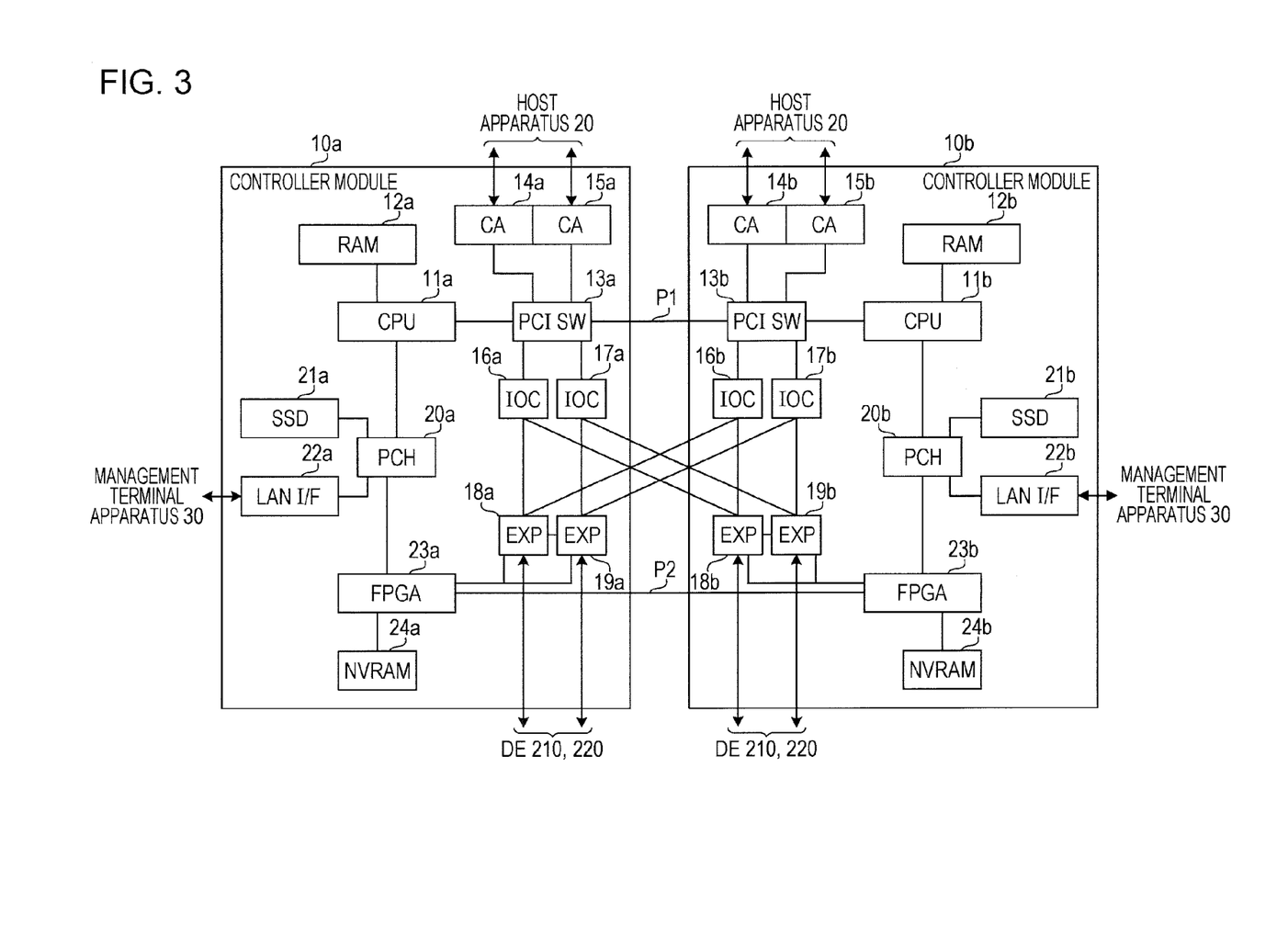
FIG. 3 illustrates a hardware configuration example of controller modules.

FIG. 3 illustrates a hardware configuration example of the controller modules 10a and 10b.

The controller module 10a includes a Central Processing Unit (CPU) 11a, a Random Access Memory (RAM) 12a, a Peripheral Component Interconnect (PCI) switch 13a, Channel Adapters (CA) 14a and 15a, In/Out controllers (IOCs)

16a and 17a, expanders 18a and 19a, a Platform Controller Hub (PCH) 20a, a SSD 21a, a LAN interface 22a, a Field Programmable Gate Array (FPGA) 23a, and a Non Volatile RAM (NVRAM) 24a. The expander 18a is an example of the first relay unit.

The controller module 10b is implemented in the same hardware configuration as that of the controller module 10a. That is, a CPU 11b, a RAM 12b, a PCI switch 13b, CAs 14b and 15b, IOCs 16b and 17b, expanders 18b and 19b, a PCH 20b, a SSD 21b, a LAN interface 22b, a FPGA 23b, and a NVRAM 24b inside the controller module 10b correspond to the CPU 11a, the RAM 12a, the PCI switch 13a, the CAs 14a and 15a, the IOCs 16a and 17a, the expanders 18a and 19a, the PCH 20a, the SSD 21a, the LAN interface 22a, the FPGA 23a, and the NVRAM 24a inside the controller module 10a, respectively. The expander 18b is an example of the second relay unit.

Hereinafter, basically the hardware configuration of the controller module 10a is described, and a description of the hardware configuration of the controller module 10b is omitted.

The CPU 11a controls the entire controller module 10a in a centralized manner. The RAM 12a is used as the primary storage device of the controller module 10a. The RAM 12a temporarily stores at least part of programs to be executed by the CPU 11a, and various kinds of data used for processing executed by the programs. The RAM 12a is also used as a cache area for data stored in the HDDs in the DE 210, 220.

The PCI switch 13a transmits and receives data between the CPU 11a, the CA 14a, 15a, and the IOC 16a, 17a. The PCI switch 13a is connected to the PCI switch 13b in the other controller module 10b. Hereinafter, the communication path between the PCI switch 13a and the PCI switch 13b is referred to as "communication path P1".

The CPU 11a of the controller module 10a and the CPU 11b of the controller module 10b are able to communicate with each other via the communication path P1. For example, the CPU 11a of the controller module 10a may acquire fault detection information from the CPU 11b of the controller module 10b via the communication path P1. The fault detection information indicates the details of a fault that has occurred in the other controller module 10b. Also, for example, the CPU 11a may also transmit cached data of the HDDs stored in the RAM 12a to the CPU 11b of the other controller module 10b via the communication path P1, and request the RAM 12b in the other controller module 10b to back up the cached data.

The CA 14a, 15a executes interfacing to transmit and receive data between the host apparatus 20 and the controller module 10a. By connecting the CAs 14a and 15a to the host apparatus 20 individually by a separate optical fiber cable, redundancy is provided for the communication path between the controller module 10a and the host apparatus 20, thereby further improving the reliability of communication.

The IOCs 16a and 17a are each a control circuit (SAS controller) that executes interfacing with the HDDs in the DE 210, 220 that is a SAS device. The expanders 18a and 19a each relay data between a SAS controller and a SAS device. The interface between the IOC 16a, 17a and the DE 210, 220 is not limited to SAS. The expanders 18a and 19a are able to communicate with each other via two paths including a path using a I$^2$C bus interface and a path using a FPGA register (both not illustrated).

The expanders 18a and 19a each have an internal memory, and retain information indicative of the power-on state of the controller module 10a (e.g. Not powered on yet, Being powered on, Power-on complete) in the internal memory.

The IOC 16a is connected to the DE 210, 220 via the expander 18a. Also, the IOC 16a is connected to the DE 210, 220 via the expander 18b in the controller module 10b. Since the IOC 16a and the DE 210, 220 are connected via the two expanders 18a and 18b in this way, redundancy is provided for the access path from the IOC 16a to the DE 210, 220. The IOC 17a is connected to the DE 210, 220 via the expander 19a. Also, the IOC 17a is connected to the DE 210, 220 via the expander 19b in the controller module 10b. Since the IOC 17a and the DE 210, 220 are connected via the two expanders 19a and 19b, redundancy is provided for the access path from the IOC 17a to the DE 210, 220.

Likewise, the IOC 16b is connected to the DE 210, 220 via the expander 18b. Also, the IOC 16b is connected to the DE 210, 220 via the expander 18a in the controller module 10a. Since the IOC 16b and the DE 210, 220 are connected via the two expanders 18a and 18b in this way, redundancy is provided for the access path from the IOC 16b to the DE 210, 220. The IOC 17b is connected to the DE 210, 220 via the expander 19b. Also, the IOC 17b is connected to the DE 210, 220 via the expander 19a in the controller module 10a. Since the IOC 17b and the DE 210, 220 are connected via the two expanders 19a and 19b, redundancy is provided for the access path from the IOC 17b to the DE 210, 220.

In the following description, the path through which the IOC 16a accesses the DE 210, 220 via the expander 18a, the path through which the IOC 17a accesses the DE 210, 220 via the expander 19a, the path through which the IOC 16b accesses the DE 210, 220 via the expander 18b, and the path through which the IOC 17b accesses the DE 210, 220 via the expander 19b are referred to as "straight paths". Also, the path through which the IOC 16a accesses the DE 210, 220 via the expander 18b, the path through which the IOC 17a accesses the DE 210, 220 via the expander 19b, the path through which the IOC 16b accesses the DE 210, 220 via the expander 18a, and the path through which the IOC 17b accesses the DE 210, 220 via the expander 19a are referred to as "cross paths".

The PCH 20a transmits and receives data between the CPU 11a, the SSD 21a, the LAN interface 22a, and the FPGA 23a.

The SSD 21a is used as the secondary storage device of the controller module 10a. The SSD 21a stores programs to be executed by the CPU 11a, various kinds of data used for execution of the programs, and the like. As the secondary storage device, for example, other kinds of non-volatile storage devices such as a HDD may be used.

The LAN interface 22a connects to the management terminal apparatus 30 via a LAN cable, and transmits and receives data to and from the management terminal apparatus 30.

When a fault during program execution is detected by the CPU 11a, the FPGA 23a receives fault detection information indicating the details of the detected fault from the CPU 11a, and stores the received fault detection information into the NVRAM 24a. Further, the FPGA 23a includes the function of communicating with the FPGA 23b of the controller module 10b. Hereinafter, the communication path between the FPGA 23a and the FPGA 23b is referred to as "communication path P2". The FPGA 23a may also transmit the fault detection information stored in the NVRAM 23a to the FPGA 23b of the controller module 10b via the communication path P2, upon request from the CPU 11a or upon request from the FPGA 23b of the controller module 10b.

The processing executed by the FPGA 23a may be executed by, for example, other kinds of control circuits such as a microcomputer.

The NVRAM 24a is a non-volatile memory that stores various kinds of data used for processing in the FPGA 23a.

The NVRAM 24a also stores information for identifying the connecting location of the expender 18a, 19a with respect to the CPU 11a. Also, fault detection information indicating the details of a fault detected by the controller module 10a is stored into the NVRAM 24a by the FPGA 23a.

In a case where power is supplied to the controller module 10a from the PSU 40a or the PSU 40b in a state in which power is not being supplied to the controller module 10a, the FPGA 23a and NVRAM 24a of the controller module 10a are activated first. Then, the expander 18a, 19a is activated. Since the FPGA 23a and the NVRAM 24a have already been activated when the expander 18a, 19a is activated, it is possible to access the NVRAM 24a from the expander 18a, 19a via the FPGA 23a.

When activated, the expander 18a, 19a accesses a predetermined register in the NVRAM 24a via the FPGA 23a. The location of the register to be accessed differs between the expanders 18a and 19a. Then, by reading information stored in the register, the expander 18a, 19a is able to learn whether it is the expander 18a or the expander 19a.

Figure 4:
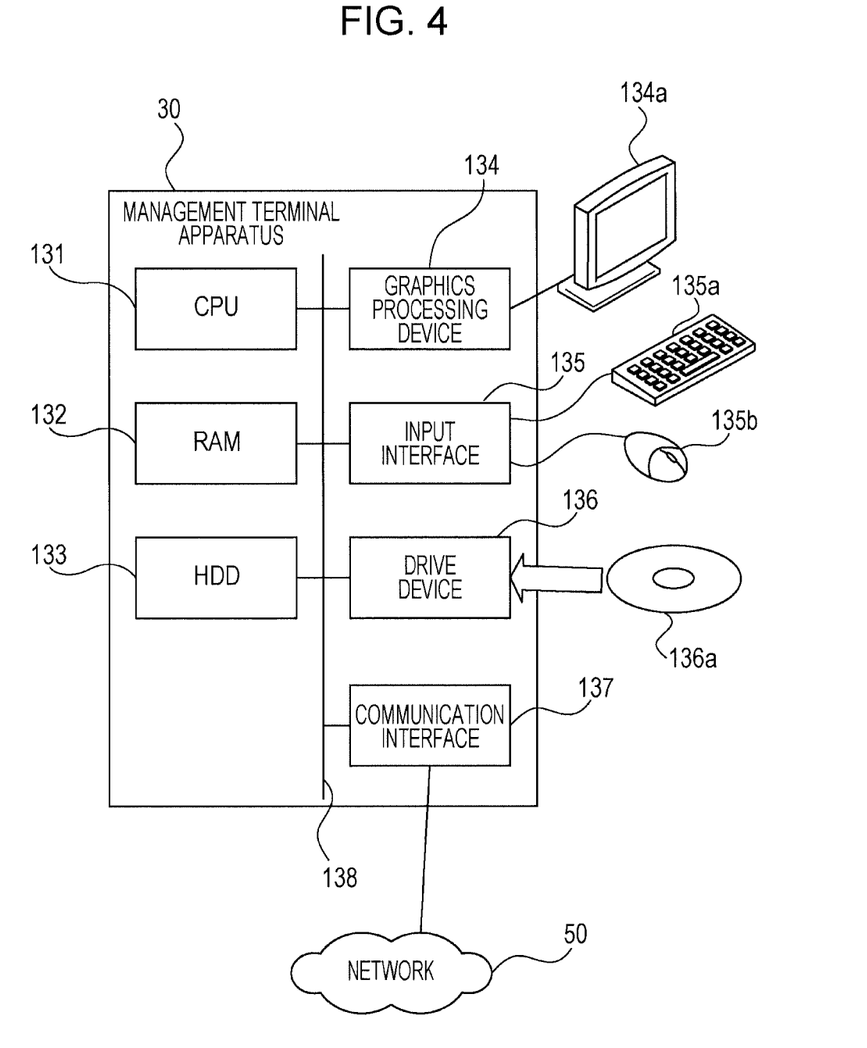
FIG. 4 illustrates a hardware configuration example of a management terminal apparatus.

FIG. 4 illustrates a hardware configuration example of the management terminal apparatus 30.

The entire management terminal apparatus 30 is controlled by a CPU 131. The CPU 131 is connected with a RAM 132 and a plurality of peripheral devices via a bus 138.

The RAM 132 is used as the primary storage device of the management terminal apparatus 30. The RAM 132 temporarily stores at least part of programs to be executed by the CPU 131. Also, the RAM 132 stores various kinds of data used for processing by the CPU 131.

The peripheral devices connected to the bus 138 include a HDD 133, a graphics processing device 134, an input interface 135, a drive device 136, and a communication interface 137.

The HDD 133 is used as the secondary storage device of the management terminal apparatus 30. Programs to be executed by the CPU 131, and various kinds of data are stored in the HDD 133. As the secondary storage device, a semiconductor storage device such as a flash memory may be used as well.

The graphics processing device 134 is connected with a monitor 134a. The graphics processing device 134 causes an image to be displayed on the screen of the monitor 134a, in accordance with an instruction from the CPU 131. Examples of the monitor 134a include a display device using a Cathode Ray Tube (CRT), and a liquid crystal display device.

The input interface 135 is connected with, for example, a keyboard 135a and a mouse 135b. The input interface 135 transmits a signal sent from the keyboard 135a or the mouse 135b to the CPU 131. The mouse 135b is an example of pointing device, and another pointing device may be used as well. Examples of another pointing device include a touch panel, a tablet, a touch pad, and a track ball.

The drive device 136 reads data recorded on an optical disc 136a by using laser light or the like. The optical disc 136a is a portable recording medium on which data is stored in a manner that allows the data to be read by reflection of light. Examples of the optical disc 106a include a Digital Versatile Disc (DVD), a DVD-ROM, a Compact Disc Read Only Memory (CD-ROM), and a CD-Recordable (R)/ReWritable (RW).

The communication interface 137 transmits and receives data to and from the controller module 10a, 10b via a LAN cable.

The host apparatus 20 may be implemented in the same hardware configuration as that in FIG. 4. However, a communication interface included in the host apparatus 20 transmits and receives data to and from the controller module 10a, 10b via an optical fiber.

Figure 5:
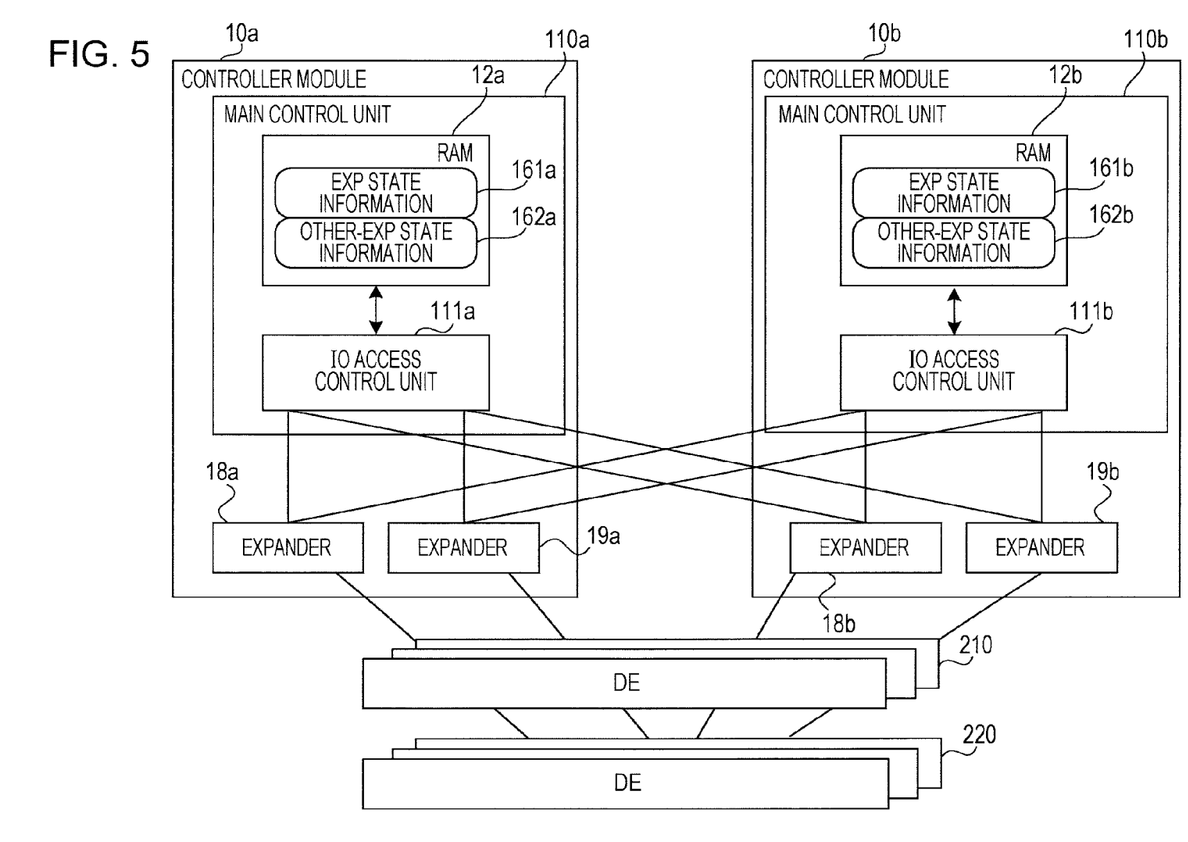
FIG. 5 is a block diagram illustrating an example of processing functions included in controller modules.

FIG. 5 is a block diagram illustrating an example of processing functions included in the controller modules 10a and 10b.

Basically, processing functions included in the controller module 10a are described with reference to FIG. 5, and a description of processing functions included in the controller module 10b is omitted.

The CPU 11a has an IO access control unit 111a. The IO access control unit 111a controls access to a HDD in the DE 210, 220. The IO access control unit 111a receives an access request for a HDD in the DE 210 or a HDD in the DE 220, which is issued from the host apparatus 20, from the CA 14a or the CA 15a. Then, the IO access control unit 111a accesses the HDD in the DE 210 or the HDD in the DE 220 via a straight path or a cross path.

When making access to the DE 210, 220, the IO access control unit 111a designates which one of a straight path and a cross path is to be used by the IOC 16a, 17a to access the DE 210, 220. When making access to the DE 210, 220, the IO access control unit 111a determines which one of a straight path and a cross path is to be used to access the DE 210, 220, on the basis of expander (EXP) state information 161a and other-expander state information 162a stored in the RAM 12a.

The expander state information 161a is information indicating the operating state of the expander 18a, 19a of the controller module 10a. The other-expander state information 162a is information indicating the operating state of the expander 18b, 19b of the other controller module 10b. Specifically, the expander state information 161a and the other-expander state information 162a both take the two kinds of values "Normal" indicating that the corresponding expander is available for use, and "Fault" indicating that the corresponding expander is not available for use.

The IO access control unit 111a accesses the DE 210, 220 by using a path that goes through an expander corresponding to the state information whose value is "Normal" out of the expander state information 161a and the other-expander state information 162a. For example, if the expander state information 161a and the other-expander state information 162a are both "Normal", the IO access control unit 111a accesses the DE 210, 220 by using a straight path. If the expander state information 161a is "Normal", and the other-expander state information 162a is "Fault", the IO access control unit 111a accesses the DE 210, 220 by using a straight path. If the other-expander state information 162a is "Normal", and the expander state information 161a is "Fault", the IO access control unit 111a accesses the DE 210, 220 by using a cross path.

Figure 6:
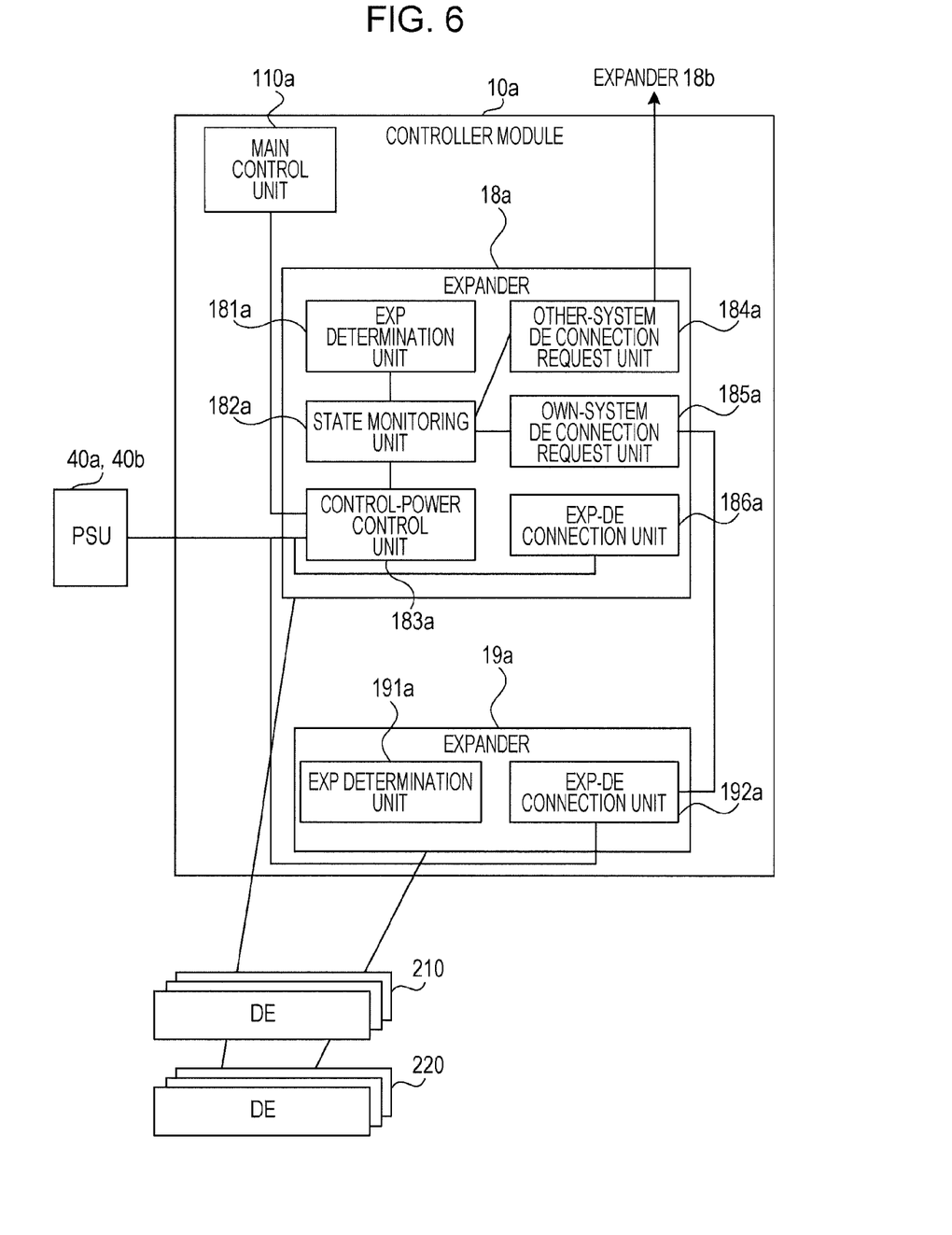
FIG. 6 is a block diagram illustrating the functions of expanders.

Next, the functions of the expanders 18a, 19a, 18b, and 19b are described. While the function of the expander 18a is described hereinafter, the expanders 19a, 18b, and 19b also have the same functions as the expander 18a.

FIG. 6 is a block diagram illustrating the functions of the expanders 18a and 19a.

The expander 18a has an EXP determination unit 181a, a state monitoring unit 182a, a control-power control unit 183a, an other-system DE connection request unit 183a, an own-system DE connection request unit 184a, and an EXP-DE connection unit 186a.

The EXP determination unit 181a accesses the NVRAM 24a via the FPGA 23a to determine that the expander of the own system is the expander 18a.

Upon supply of power to the expander 18a from the PSU 40a or the PSU 40b, the state monitoring unit 182a operated by a resident power source starts monitoring of the state of hardware in the controller module 10a when instructed from the user, for example. The items to be monitored include, for example, the temperature detected by a temperature sensor placed at a predetermined location in the controller module 10a, the voltage detected by a voltage sensor placed at a predetermined location in the controller module 10a, and component mounting status. These pieces of information are stored in, for example, the NVRAM 24a. The state monitoring unit 182a performs monitoring by periodically reading information stored in the NVRAM 24a. While temperature, voltage, and component mounting status are given as an example of monitoring items in this embodiment, the monitoring items are not limited to temperature, voltage, and component mounting status. At the point when monitoring of the state of hardware in the controller module 10a is started, power is supplied only to the expander 18a and the expander 19a, and power is not supplied to the main control unit 110a.

The state monitoring unit 182a causes the controller module 10a to transition to a first power-on state or a second power-on state described later, in accordance with the presence/absence of a fault determined as a result of monitoring (if a fault is present, the kind of the fault). When effecting a transition to the first power-on state or the second power-on state, the state monitoring unit 182a requests the control-power control unit 183a, the other-system DE connection request unit 184a, the own-system DE connection request unit 185a, and the EXP-DE connection unit 185a to perform processing described later.

The control-power control unit 183a supplies the power supplied from the PSU 40a or the PSU 40b, to the main control unit 110a upon request from the state monitoring unit 182a. When power is supplied to the main control unit 110a, the IO access control unit 111a establishes connection with the expander 18a, 19a and the expander 18b, 19b.

The other-system DE connection request unit 184a requests the expander 18b to establish connection of the expander 18b to the DE 210, 220, upon request from the state monitoring unit 182a.

The own-system DE connection request unit 185a requests the expander 19a to establish connection of the expander 19a to the DE 210, 220, upon request from the state monitoring unit 182a.

The EXP-DE connection unit 186a supplies the power supplied from the PSU 40a or the PSU 40b, to the DE 210, 220 upon request from the state monitoring unit 182a. Also, the EXP-DE connection unit 186a establishes connection between the expander 18a and the DE 210, 220.

The expander 19a has an EXP determination unit 191a, and an EXP-DE connection unit 192a. The EXP determination unit 191a has the same function as that of the EXP determination section 181a. The EXP-DE connection unit 192a supplies the power supplied from the PSU 40a or the PSU 40b, to the DE 210, 220 upon request for establishing connection with the DE 210, 220 made from the own-system DE connection request unit 185a. Also, the EXP-DE connection unit 192a establishes connection between the expander 19a and the DE 210, 220.

Next, the first power-on state and the second power-on state that may be assumed by the controller module 10a are described.

When the state monitoring unit 182a determines that a fault has not occurred as a result of monitoring the above-mentioned monitoring items, the state monitoring unit 182a notifies the control-power control unit 183a, the other-system DE connection request unit 184a, the own-system DE connection request unit 185a, and the EXP-DE connection unit 186a of a first request for causing the power-on state of the controller 10a to transition to the first power-on state. Upon receiving the first request, the control-power control unit 183a supplies the power supplied from the PSU 40a or the PSU 40b, to the main control unit 110a. When power is supplied to the main control unit 110a, the IO access control unit 111a establishes connection with the expander 18a, 19a and the expander 18b, 19b. Upon receiving the first request, the other-system DE connection request unit 184a requests the expander 18b to establish connection with the DE 210, 220. The expander 18b may ignore the request from the other-system DE connection request unit 184a if connection with the DE 210, 220 has already been established. Upon receiving the first request, the own-system DE connection request unit 185a requests the expander 19a to establish connection with the DE 210, 220. Upon receiving the first request, the EXP-DE connection unit 186a supplies the power supplied from the PSU 40a or the PSU 40b, to the DE 210, 220. Also, the EXP-DE connection unit 186a establishes connection between the expander 18a and the DE 210, 220. Therefore, it becomes possible to access the DE 210, 220 from the host apparatus 20 via the controller module 10a. Moreover, it also becomes possible for the controller module 10b to access the DE 210, 220 via a cross path (that is, an access path that goes through the expander 18a, 19a of the controller module 10a).

On the other hand, if, as a result of monitoring the above-mentioned monitoring items, the state monitoring unit 182a determines that a fault has occurred but this fault is not related to temperature or voltage, the state monitoring unit 182a determines the fault to be a relatively minor fault, and continues the state monitoring as it is. The criterion for determining whether a fault is minor is not limited to the one described in this embodiment. Then, if the state monitoring unit 182a receives a connection establishment request from the expander 18b while continuing the state monitoring, the state monitoring unit 182a notifies the own-system DE connection request unit 185a and the EXP-DE connection unit 186a of a second request for causing the power-on state of the controller module 10a to transition to the second power-on state. Upon receiving the second request, the own-system DE connection request unit 185a requests the expander 19a to establish connection with the DE 210, 220. Upon receiving the second request, the EXP-DE connection unit 186a supplies the power supplied from the PSU 40a or the PSU 40b, to the DE 210, 220. Also, the EXP-DE connection unit 186a establishes connection between the expander 18a and the DE 210, 220. In the second power-on state, power is not supplied to the main control unit 110a, and thus it is not possible to access the DE 210, 220 from the host apparatus 20 via the controller module 10a. However, the transition to the second power-on state causes the expander 18a, 19a to become operational. Therefore, in a state in which a main control unit 110b of the controller module 10b is activated, it is possible for the host apparatus 20 to access the DE 210, 220 by using a cross path that goes through the expander 18a, 19a. In the second power-on state, it is possible for the controller module 10b to access the DE 210, 220 by selectively using two paths, a straight path and a cross path. This maintains a state in which redundancy is provided for the access path from the controller module 10b to the DE 210, 220. Also, in the second power-on state, when the state monitoring unit 182a determines as a result of monitoring that the fault has been resolved, the state monitoring unit 182a notifies the control-power control unit 183a, the other-system DE connection request unit 184a, the own-system DE connection request unit 185a, and the EXP-DE connection unit 186a of the first request for causing the power-on state of the controller 10a to transition to the first power-on state. When the first request is received after the second request, the own-system DE connection request unit 185a and the EXP-DE connection unit 186a may ignore the first request because of overlapping processing.

If, as a result of determining the kind of the fault, the state monitoring unit 182a determines the fault that has occurred to be related to temperature or voltage, the state monitoring unit 182a determines the fault to be a relatively major fault, and turns off the power to the expander 18a. The criterion for determining whether a fault is major is not limited to the one described in this embodiment.

Like the controller module 10a, the controller module 10b also assumes at least two kinds of states, the first power-on state and the second power-on state, as its power-on state.

While this embodiment is directed to the case where the expander 19a has a function different from the function of the expander 18a, the expander 19a may have a function equivalent to the function of the expander 18a.

Figure 7:
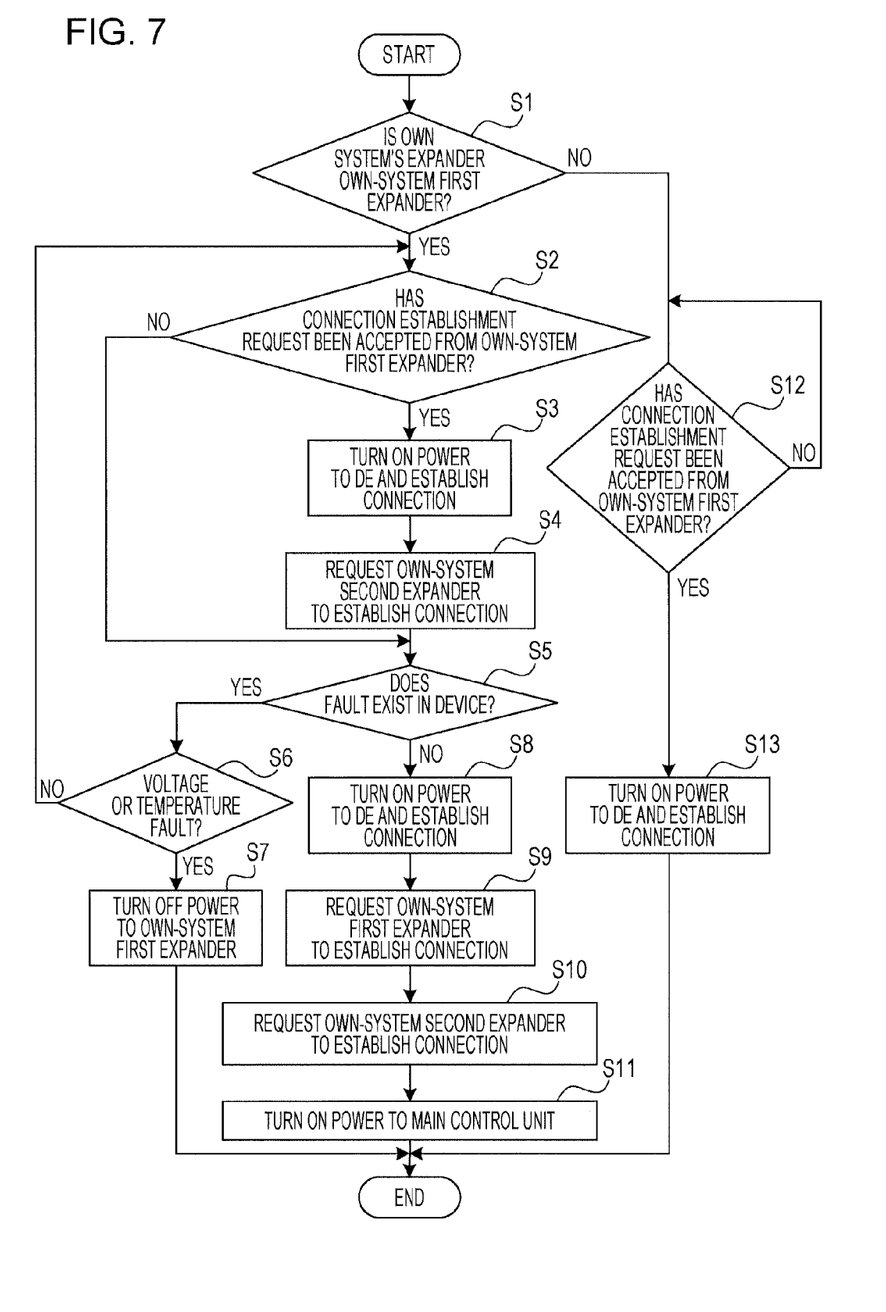
FIG. 7 is a method illustrating processing in expanders.

Next, a description is given of processing in the expander 18a and the expander 19a when the PSU 40a or the PSU 40b supplies power to the expander 18a in a state in which power is not being supplied to the controller module 10a.

FIG. 7 is a method illustrating processing in the expanders 18a and 19a. In FIG. 7, for the convenience of description, the expander 18a is noted as "own-system first expander", the expander 19a is noted as "own-system second expander", and the expander 18b is noted as "own-system first expander".

In step S1, the EXP determination unit 181a and the EXP determination unit 191a each determine whether the expander of the own system is the expander 18a or the expander 19a. If the own system's expander is the expander 18a (step S1; Yes), the processing shifts to step S2. If the own system's expander is the expander 19a (step S1; No), the processing shifts to step S12.

In step S2, the state monitoring unit 182a starts state monitoring. Then, the state monitoring unit 182a determines whether or not a connection establishment request has been accepted from the expander 18b. If a connection establishment request has been accepted from the expander 18b (step S2; Yes), the processing shifts to step S3. If a connection establishment request has been accepted from the expander 18b (step S2; No), the processing shifts to step S5.

In step S3, the state monitoring unit 182a notifies the own-system DE connection request unit 185a and the EXP-DE connection unit 186a of the second request for effecting a transition to the second power-on state. Upon receiving the second request, the EXP-DE connection unit 186a establishes connection between the expander 18a and the DE 210, 220. Thereafter, the processing shifts to step S4.

In step S4, upon receiving the second request, the own-system DE connection request unit 185a requests the expander 19a to establish connection with the DE 210, 220. Thereafter, the processing shifts to step S5.

In step S5, the state monitoring unit 182a determines whether or not a fault has occurred in the controller module 10a. If it is determined that a fault has occurred in the controller module 10a (step S5; Yes), the processing shifts to step S6. If it is determined that a fault has not occurred in the controller module 10a (step S5; No), the processing shifts to step S8.

In step S6, the state monitoring unit 182a determines whether or not the fault that has occurred is related to temperature or voltage. If it is determined that the fault that has occurred is related to temperature or voltage (step S6; Yes), the processing shifts to step S7. If it is determined that the fault that has occurred is not related to temperature or voltage (step S6; No), the processing shifts to step S2.

In step S7, the state monitoring unit 182a turns off the power to the expander 18a. Thereafter, the processing in FIG. 7 is ended.

In step S8, hereinafter, in steps S8 and steps S9 to S11, a process of effecting a transition to the first power-on state is executed. First, the state monitoring unit 182a notifies the EXP-DE connection unit 186a of the first request. Thereafter, the processing shifts to step S9. Upon receiving the first request, the EXP-DE connection unit 186a supplies the power supplied from the PSU 40a or the PSU 40b, to the DE 210, 220. Also, the EXP-DE connection unit 186a establishes connection between the expander 18a and the DE 210, 220.

In step S9, the state monitoring unit 182a notifies the other-system DE connection request unit 184a of the first request. Thereafter, the processing shifts to step S10. Upon receiving the first request, the other-system DE connection request unit 184a requests the expander 18b to establish connection with the DE 210, 220. As mentioned previously, if connection with the DE 210, 220 has already been established, the expander 18b may ignore the request from the other-system DE connection request unit 184a.

In step S10, the state monitoring unit 182a notifies the own-system DE connection request unit 185a of the first request. Thereafter, the processing shifts to step S11. Upon receiving the first request, the own-system DE connection request unit 185a requests the expander 19a to establish connection with the DE 210, 220. Upon request for establishing connection with the DE 210, 220 from the own-system DE connection request unit 185a, the EXP-DE connection unit 192a supplies the power supplied from the PSU 40a or the PSU 40b, to the DE 210, 220. Also, the EXP-DE connection unit 192a establishes connection between the expander 19a and the DE 210, 220.

In step S11, the state monitoring unit 182a notifies the control-power control unit 183a of the first request. Thereafter, the processing in FIG. 7 is ended. Upon receiving the first request, the control-power control unit 183a supplies the power supplied from the PSU 40a or the PSU 40b, to the main control unit 110a. With the supply of power to the main control unit 110a, the main control unit 110a is activated, and establishes connection with the expander 18a, 19a.

In step S12, the EXP-DE connection unit 192a determines whether or not a request for establishing connection between the expander 19a and the DE 210, 220 has been accepted from the expander 18a. If a request for establishing connection between the expander 19a and the DE 210, 220 has been accepted from the expander 18a (step S12; Yes), the processing shifts to step S13. If a request for establishing connection between the expander 19a and the DE 210, 220 has not been accepted from the expander 18a (step S12; No), the EXP-DE connection unit 192a waits for acceptance of a request for establishing connection between the expander 19a and the DE 210, 220.

In step S13, the EXP-DE connection unit 192a supplies the power supplied from the PSU 40a or the PSU 40b, to the DE 210, 220. Also, the EXP-DE connection unit 192a establishes connection between the expander 19a and the DE 210, 220. Thereafter, the processing in FIG. 7 is ended.

As has been described above, according to the storage apparatus 100, a redundant path between the host apparatus 20 and the DE 210, 220 may be secured if either one of the main control units 110a and 110b is activated. Accordingly, the safety of device operation may be ensured.

While the storage apparatus and the control method for the storage apparatus according to the embodiments have been described above with reference to the drawings, the embodiments are not limited to these embodiments. The configuration of each individual unit may be substituted by another arbitrary configuration that provides the same function. Also, other arbitrary structures or steps may be added to the embodiments.

Of the aforementioned embodiments, arbitrary two or more configurations (features) may be used in combination.

The above-mentioned processing functions may be implemented by a computer. In that case, a program describing the details of processing executed by functions included in the first controller 4, the second controller 5, and the controller module 10a, 10b is provided. By executing the program by a computer, the above-mentioned processing functions are implemented on the computer. The program describing the details of processing may be pre-recorded on a computer-readable recording medium. Examples of the computer-readable recording medium include a magnetic storage device, an optical disc, a magneto-optical recording medium, and a semiconductor memory. Examples of the magnetic storage device include a hard disk drive, a flexible disc (FD), and a magnetic tape. Examples of the optical disc include a DVD, a DVD-RAM, and a CD-ROM/RW. Examples of the magneto-optical recording medium include a Magneto-Optical disk (MO).

To distribute a program, for example, a portable recording medium such as a DVD or a CD-ROM on which the program is recorded is sold. Also, the program may be stored in a storage device of a server computer in advance, and the program may be transferred to another computer from the server computer via a network.

A computer that executes a program stores a program recorded on a portable recording medium or a program transferred from a server computer, into its own storage device. Then, the computer reads the program from its own storage device, and executes processing according to the program. The computer may be also configured to read a program directly from a portable recording medium, and execute processing according to the program. Also, the computer may be configured to execute processing according to a received program sequentially every time a program is transferred from a server computer connected via a network.

At least part of the above-mentioned processing functions may be also implemented by an electronic circuit such as a Digital Signal Processor (DSP), an Application Specific Integrated Circuit (ASIC), or a Programmable Logic Device (PLD).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage apparatus comprising:
   a first controller that generates an access to a storage device; the first controller includes:
   a first relay unit configured to relay the access to the storage device; and
   an access control unit configured to be activated after activation of the first relay unit and to relay the access to the storage device via a second relay unit; and
   a second controller that includes the second relay unit and generates the access to the storage device,
   wherein when the first relay unit receives a connection request for an access path between the first relay unit and the storage device from the second controller, the first relay unit establishes the access path to the storage device irrespective of an activation state of the access control unit.

2. The storage apparatus according to claim 1, wherein after establishing the access path to the storage device, the first relay unit notifies the second relay unit of a connection request to the storage device, and upon receiving the connection request notified by the first relay unit, the second relay unit establishes an access path to the storage device irrespective of an activation state of the access control unit of the second controller.

3. The storage apparatus according to claim 2, wherein when the second relay unit receives the connection request notified by the first relay unit for connection between the second relay unit and the storage device in a state in which the access path established by the second relay unit to the storage device is established, the second relay unit ignores the connection request notified by the relay unit.

4. The storage apparatus according to claim 1, further comprising:
   a sensor configured to detect occurrence of a fault in the first controller,
   wherein when the sensor detects the occurrence of the fault, depending on a kind of the fault, the access control unit does not activate itself, and the first relay unit maintains a state in which the access path to the storage device is established.

5. A controlling method performed by a storage apparatus that includes a first controller and a second controller each generating an access to a storage device, the controlling method comprising:
   relaying an access to the storage device by a first relay unit included in the first controller; and
   establishing an access path to the storage device by the first relay unit, irrespective of an activation state of an access control unit, when the first relay unit receives a connection request for the access path between the first relay unit and the storage device from the second controller before the access control unit is activated to control access to the storage device via a second relay unit included in the second controller.

* * * * *

UNITED STATES PATENT AND TRADEMARK OFFICE
CERTIFICATE OF CORRECTION

PATENT NO. : 8,683,146 B2
APPLICATION NO. : 13/416567
DATED : March 25, 2014
INVENTOR(S) : Iizuka et al.

It is certified that error appears in the above-identified patent and that said Letters Patent is hereby corrected as shown below:

On the Title Page Item [75] (Inventors), Line 3, Delete "Kawaski" and insert -- Kawasaki --, therefor.

In the Claims

Column 14, Line 32, In Claim 3, Delete "the relay" and insert -- the first relay --, therefor.

Signed and Sealed this
Twenty-fourth Day of June, 2014

Michelle K. Lee
*Deputy Director of the United States Patent and Trademark Office*